United States Patent
Clutton

[19]

[11] Patent Number: 6,045,180
[45] Date of Patent: Apr. 4, 2000

[54] CYCLE SEAT

[75] Inventor: Peter David Clutton, Mermaid Watters, Australia

[73] Assignee: Harrodon Holdings Limited, Kumul Highway, Vanuatu

[21] Appl. No.: 09/194,765

[22] PCT Filed: Jun. 16, 1997

[86] PCT No.: PCT/AU97/00348

§ 371 Date: Dec. 3, 1998

§ 102(e) Date: Dec. 3, 1998

[87] PCT Pub. No.: WO97/47513

PCT Pub. Date: Dec. 18, 1997

[30] Foreign Application Priority Data

Jun. 7, 1996 [AU] Australia .................................. P00288

[51] Int. Cl.⁷ ...................................................... B62J 1/00
[52] U.S. Cl. .................. 297/202; 297/215.1; 297/215.16
[58] Field of Search ................................ 297/214, 195.1, 297/202, 215.1, 215.16

[56] References Cited

U.S. PATENT DOCUMENTS

| 4,572,575 | 2/1986 | Golden et al. | 297/214 |
| 4,773,705 | 9/1988 | Terranova | 297/214 |
| 5,011,222 | 4/1991 | Yates et al. | 297/214 |
| 5,076,642 | 12/1991 | Beylet et al. | 297/214 |

*Primary Examiner*—Anthony D. Barfield
*Attorney, Agent, or Firm*—Young & Thompson

[57] ABSTRACT

A cycle seat providing rider comfort and accommodating various styles of riding while providing substantially minimal pressure on the urogenital area of the rider during pedalling. The lateral portions of the seat do not interfere with the thighs of the rider during pedalling, thus allowing the legs of the rider to be angle downward to meet the pedals of the seat with substantially minimal obstruction. The cycle seat includes a ridge-like member intermediate to support surfaces which are adapted to support respective ischial tuberosities of the rider. The central ridge-like member supports the coccyx and the pubic bones of the rider when the upper torso of the rider is substantially upright and is also capable of supporting the public bones when the rider's pelvis is angled substantially forward.

12 Claims, 6 Drawing Sheets

CYCLE SEAT

This invention relates to cycle seats.

Cycle seats are often referred to as saddles and the terms cycle seat and saddles shall be used interchangeably in this specification. In addition throughout the specification, the term "pubic bones" refers to the left and right inferior rami of the pubic bones.

Broadly a cycle seat comprises a member having a rider support surface which supports the posterior of a rider and a downwardly facing seat mounting surface. In general terms the aim of the design of a cycle seat is to provide a rider support surface which stabilises the posterior of a rider while providing a relatively high level of rider comfort and also provides a low level of interference with the legs of a rider during pedalling.

Many attempts have been made to provide a cycle seat meeting these requirements but none has proved totally satisfactory. Naturally it would be advantageous if a cycle seat could be devised which was able to stabilise the lateral position of a rider's posterior while at the same time permitting the riders legs the freedom to vigorously pedal the cycle.

According to an aspect of this invention there is provided a seat for use with a cycle. The seat includes: a member having a rider support surface with a leading edge and a rear edge and an opposed seat mounting surface, for mounting to the cycle the rider support surface being substantially horizontally extending and having a pronounced centrally positioned longitudinally extending ridge formation, and support formations disposed on either side of the ridge formation, the support formations being arranged below the ridge formation, and providing support for the ischial tuberosities and surrounding soft tissue of a rider, wherein the ridge formation extends substantially the full length of the support surface between said leading edge and said rear edge, but terminates short of the perineal region of the rider so as not to interfere therewith while riding, and the rider support surface curves upwardly from the support formations to join the ridge formation. The ridge formation has an apex extending therealong and the formation is configured to extend into a region between the rider's buttocks for resisting lateral movement of the rider's pelvis during riding.

Typically the leading edge is spaced a short distance forwardly of the support formations supporting the ischial tuberosities so as not to interfere unduly with the movement of the thighs of a rider during pedalling.

Preferably the apex of the ridge formation is rounded and the leading edge of the member tapers downwardly forwardly from the rider support surface.

Advantageously the member further includes a truncated pommel portion projecting forwardly outwardly from the leading edge of the member in axial alignment with the ridge formation. Typically the pommel portion slopes downwardly towards its leading edge.

Preferably the support formations on either side of the ridge formation slope generally downwardly from the rear of the member towards the leading edge of the member, eg at an angle of 10 degrees to 20 degrees.

Preferably the rear of the member is closely spaced from the rear of the support formations for supporting the ischial tuberosities of rider.

In a particularly preferred form the member has a lateral extent extending laterally outwardly beyond the support formations for supporting the ischial tuberosities of a user and the lateral extent of the member is substantially greater than the axial or longitudinal extent of the member. Advantageously the lateral extent of the member is more than twice as great as the axial or longitudinal extent of the member from the rear of the member to the front of the pommel portion.

Preferably the member is formed from a substantially rigid material which is covered by a layer of resilient material. Typically the member is formed from a thermoplastic material such as nylon and polypropylene.

Naturally the seat mounting surface of the cycle seat will typically include mounting means, eg in the form of a bracket, for mounting the seat onto a cycle frame.

A cycle seat in accordance with this invention may manifest itself in a variety of forms. It will be convenient to hereinafter describe in detail two preferred embodiments of the invention with reference to the accompanying drawings. This will enable persons having an interest in the subject matter of the invention to readily put the invention into practical effect. It is to be clearly understood however that the specific nature of these descriptions does not supersede the generality of the preceding broad description. In the drawings.

Figure 1:
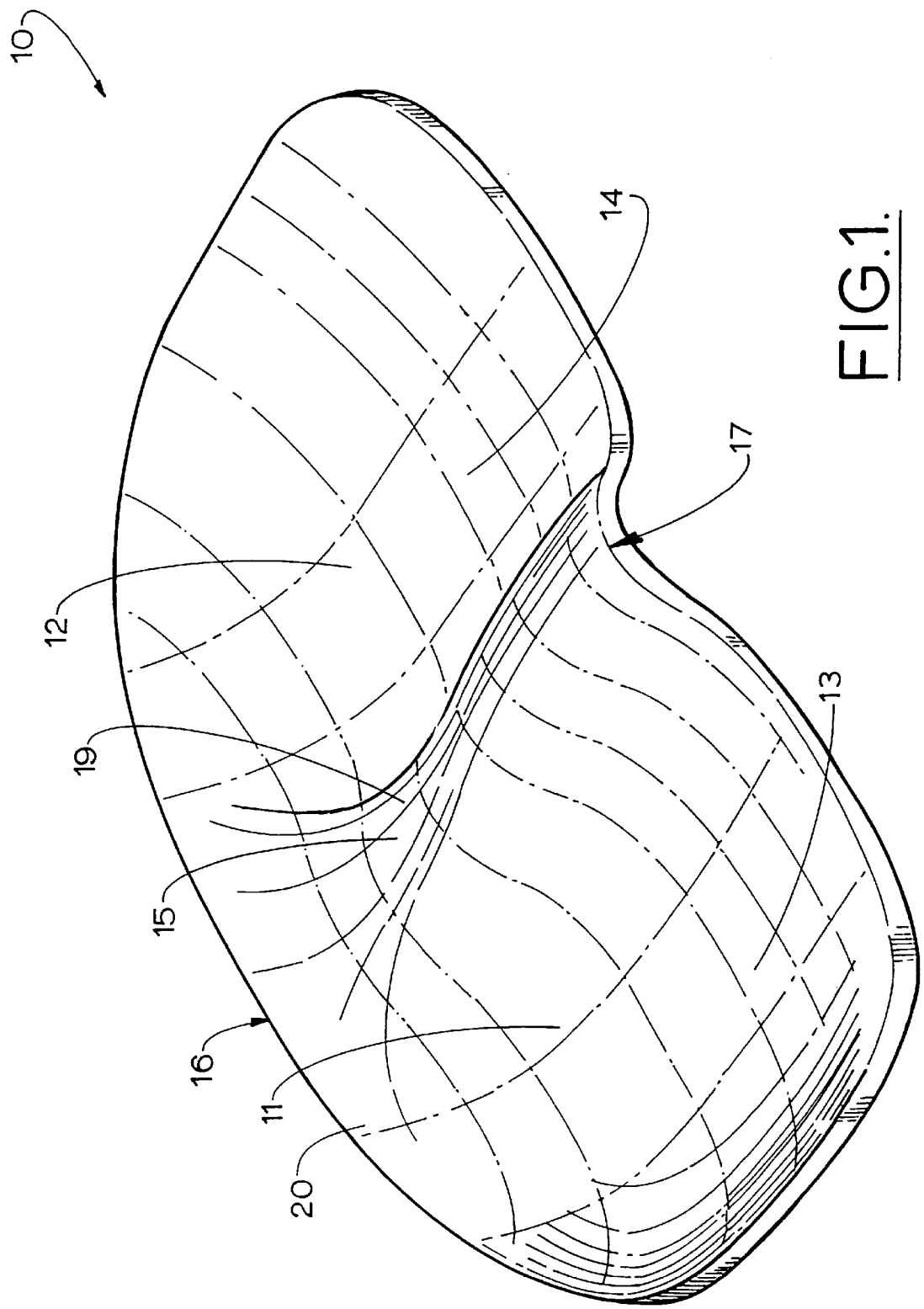
FIG. 1 is a three dimensional view of a cycle seat in accordance with one embodiment of the invention.

In FIGS. 1 to 4, reference numeral 10 refers generally to a cycle seat in accordance with the invention.

The seat 10 comprises a member which defines two support formations 11 and 12, each of which has a substantially planar portion 13 and 14 on either side of a centrally positioned longitudinally extending ridge formation 15. The ridge formation 15 extends from the rear 16 to the front 17 of the seat 10.

Figure 2:
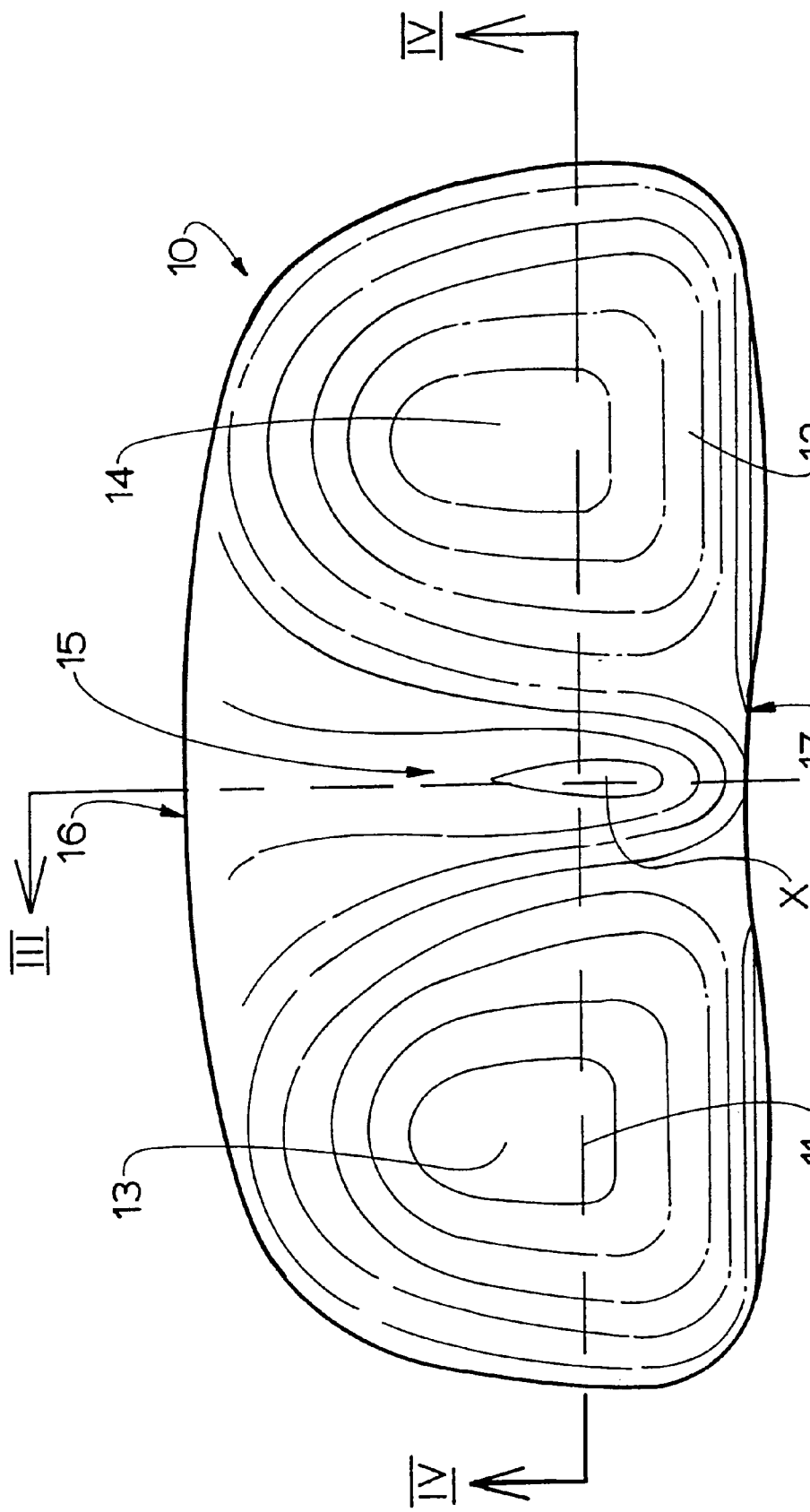
FIG. 2 is a top plan view of the cycle seat of FIG. 1 with contour lines marked in on the seat.

The ridge formation 15 has a substantially convex cross section. The ridge formation 15 also has a concavity 19 on its longitudinal cross section from which it extends rearwardly and upwardly. FIG. 2 which has contour lines give a detailed picture of the topography of the seat 10.

The formations 11 and 12 support the ischial tuberosities of a rider generally along the line IV—IV as shown in FIG. 2 when the upper torso of a rider is in an upright position and also when the upper torso is angled downwardly forwardly over the handle bars of a bike.

The ridge formation 15 also supports the coccyx 27 of a rider generally at point X in FIG. 2 when the upper torso of the rider is upright. The formations 11 and 12 are closely spaced from the front of the member 11 so that the member 11 does not interfere with the thighs of a rider during pedalling.

Figure 3:
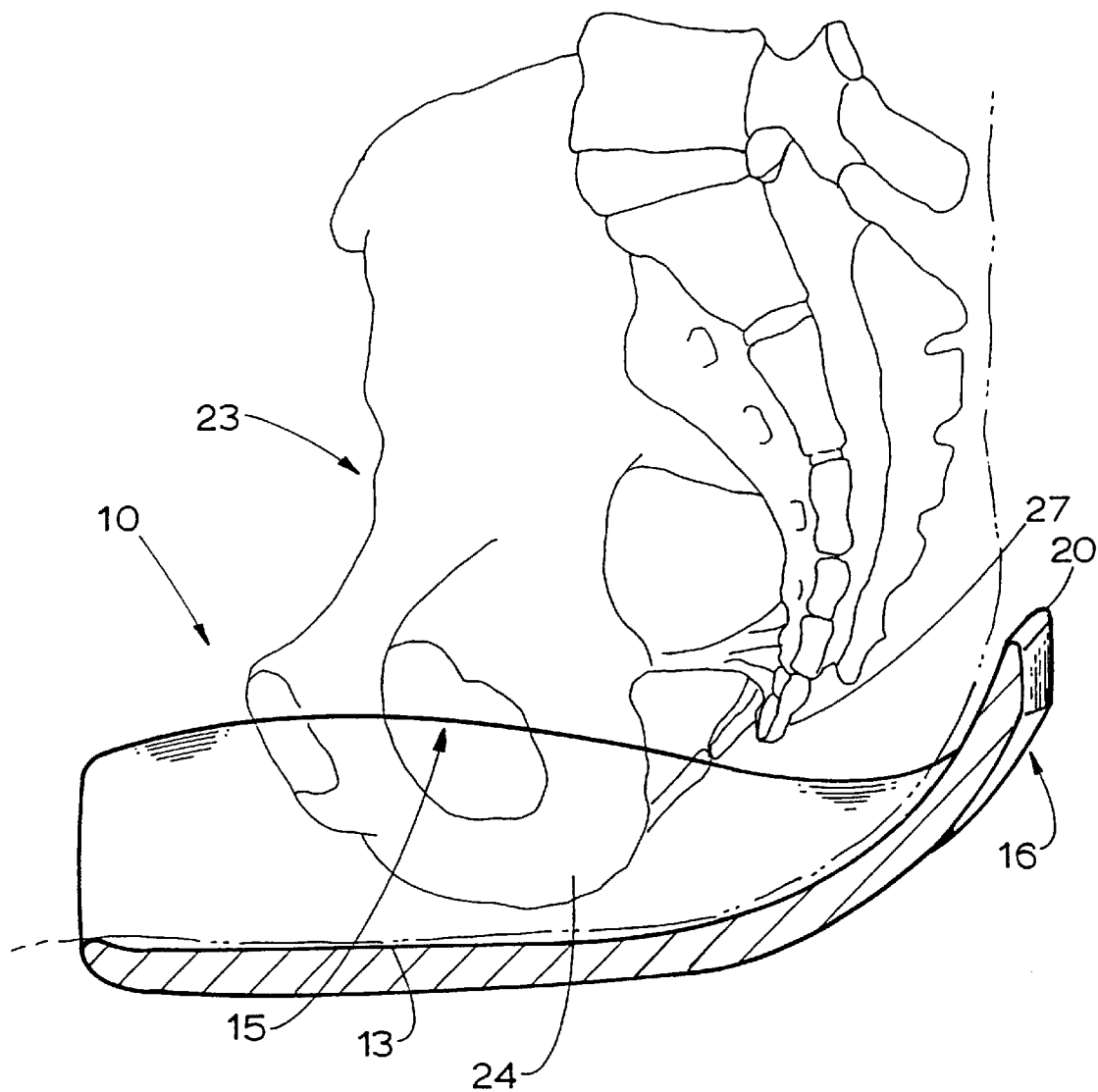
FIG. 3 is a longitudinal cross sectional view of the cycle seat of FIG. 1, section through III—III.
Figure 4:
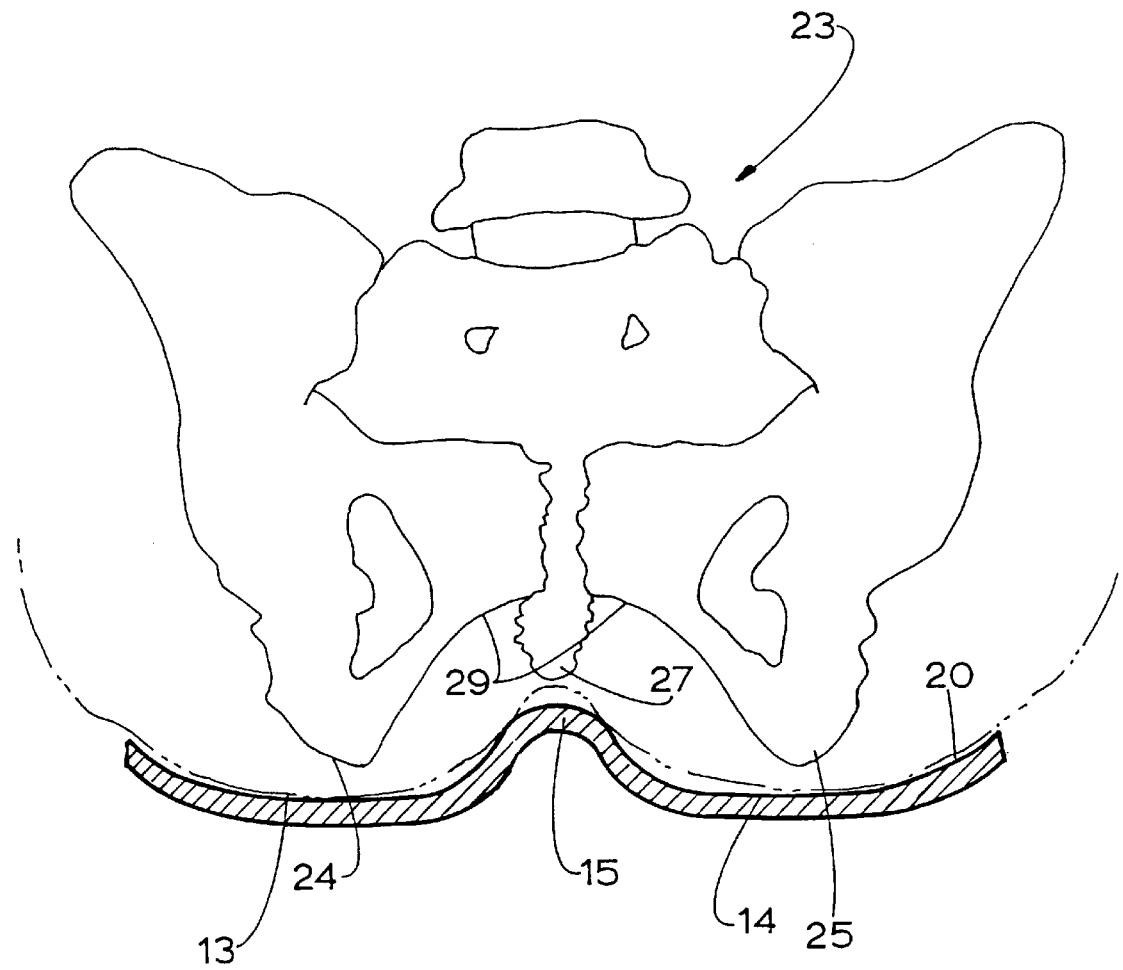
FIG. 4 is a transverse sectional view of the cycle seat of FIG. 1, section through IV—IV.
Figure 5:
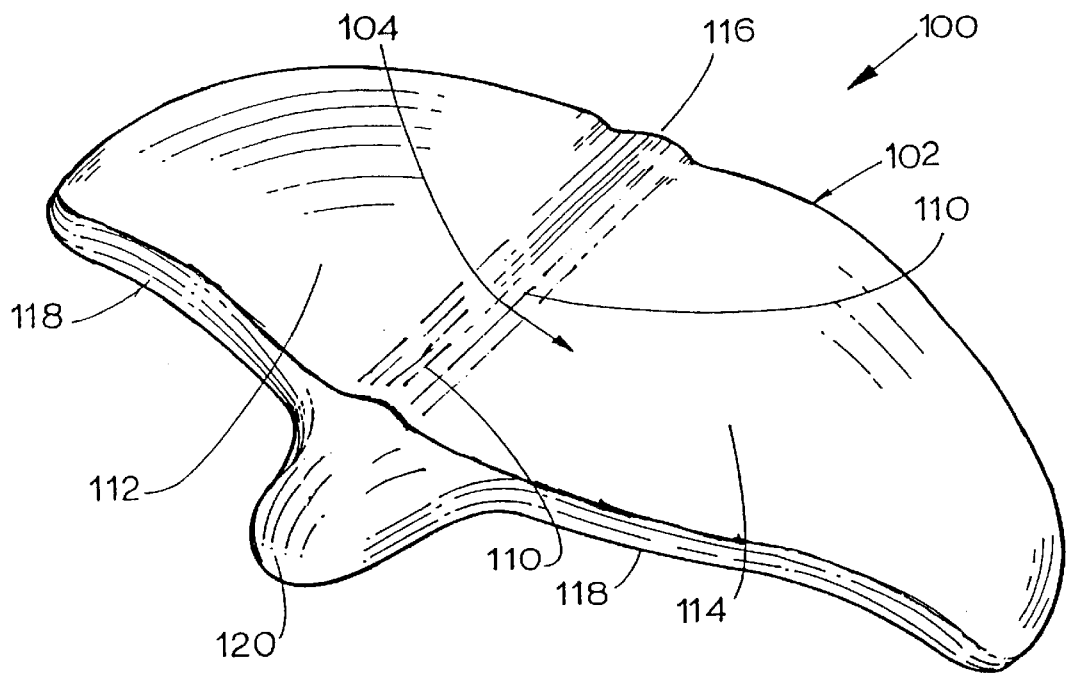
FIG. 5 is an upper three dimensional view of a cycle seat in accordance with a second embodiment of the invention.

FIGS. 3 and 4 illustrate respectively longitudinal and transverse cross sectional views of the cycle seat of FIG. 1 showing the positions of the pelvic bones of a rider when they adopt an upright position during pedalling. The planar portions 13 and 14 of the formations 11 and 12 support the ischial tuberosities 24 and 25 of the rider. The formations 11 and 12 also support a fair amount of the riders posterior surrounding the ischial tuberosities.

The seat 10 also includes a raised edge 20 extending along the rear 16 of the seat 10. The raised rear edge 20 resists rearward displacement of the pelvis 23 of the rider during pedalling.

The difference in height between the support formations 11 and 12 and the ridge formation 15 facilitates support for the coccyx 27 of a rider when their torso is substantially upright. The ridge formation 15 also acts to resist sideways movement of the pelvis 23 during pedalling.

The cross sectional shape of the ridge formation 15 is roughly complementary to that of the arch region of the pubic bones. Thus if the rider adopts an upright position when pedalling, the weight of the rider is spread between the ischial tuberosities 24 and 25, the coccyx 27 and the pubic bones 29. This provides a favourable distribution of the mass of the rider reducing point pressure.

FIGS. 5 to 9 illustrate a seat in accordance with a second embodiment of the invention. In the drawings the seat is referred to generally by the numeral 100.

The seat 100 comprises broadly a member 102 having a rider support surface 104 and an opposed seat mounting surface 106. The rider support surface 104 defines a longitudinally extending ridge formation 110 and support formations 112 and 114 disposed on either side of the ridge formations 110.

The ridge formation 110 is rounded, curving upwardly from the support formations 112 and 114 and having a rounded apex at its peak. Thus the ridge formation 110 has a substantially convex cross section. The ridge formation 110 is also centrally positioned on the rider support surface 104 and extends longitudinally from a rear edge 116 of the member 102 to a leading edge 118 thereof terminating short of the perineal region of a rider.

The leading edge 118 of the member 102 terminates a short distance forwardly of the support formations 112 and 114 so that the member 102 does not interfere with the thighs of a rider during pedaling. The leading edge 118 is rounded or tapered to make it ergonomically attractive.

The member 102 also includes a truncated pommel portion 120 projecting forwardly outwardly from the leading edge 118 of the member 102 in axial alignment with the ridge formation 110. The pommel 120 slopes downwardly towards its leading edge 118 so that it does not interfere with the genitals of a rider. It will be clearly seen that this pommel 120 is substantially shorter than the typical cycle seat pommel.

The support formations 112 and 114 are typically generally circular when viewed in plan view and are noticeably lower than the ridge formation 110. The formations 112 and 114 are generally at least slightly recessed below the surrounding portions of the rider support surface 104. The recesses are positioned to be broadly aligned with the ischial tuberosities of a rider.

While the rear edge 116 of the member is raised, the rider support surface generally slopes downwardly towards the leading edge thereof, eg at 20–30°.

When viewed in plan view, the rider support surface 104 resembles somewhat a bird in flight with wings outstretched. The surface 104 has a lateral extent extending laterally outwardly beyond the support formations 112 and 114 with each side tapering to a point. In the illustrated embodiment the lateral extent or width of the rider support surface 104 is more than twice the longitudinal length of the member 102 from the rear edge 116 to the front of the pommel portion 120.

Figure 6:
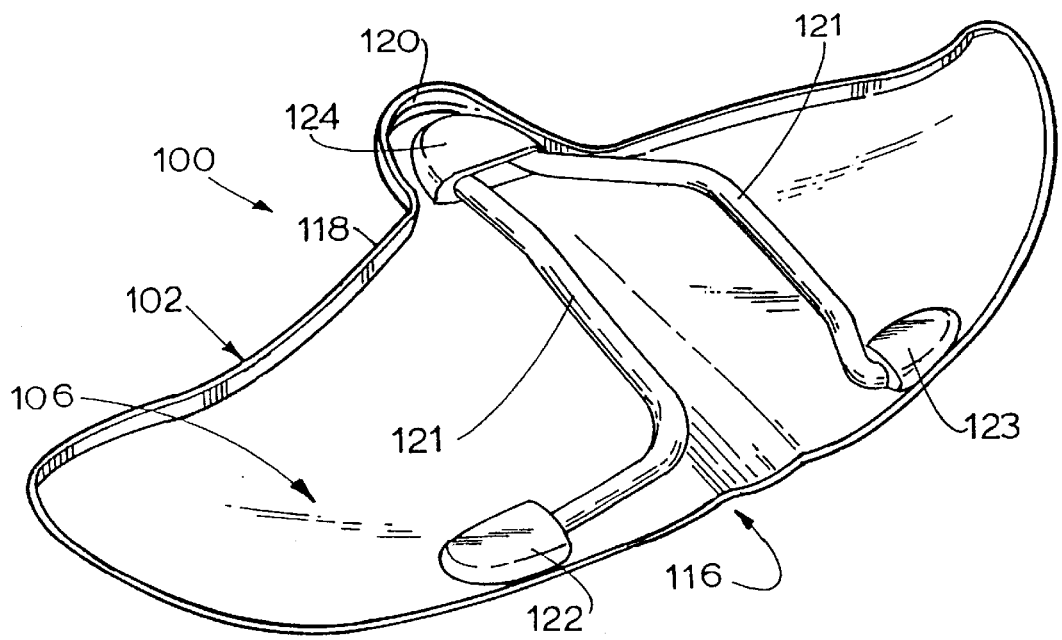
FIG. 6 is a lower three dimensional view of the cycle seat of FIG. 5
Figure 7:
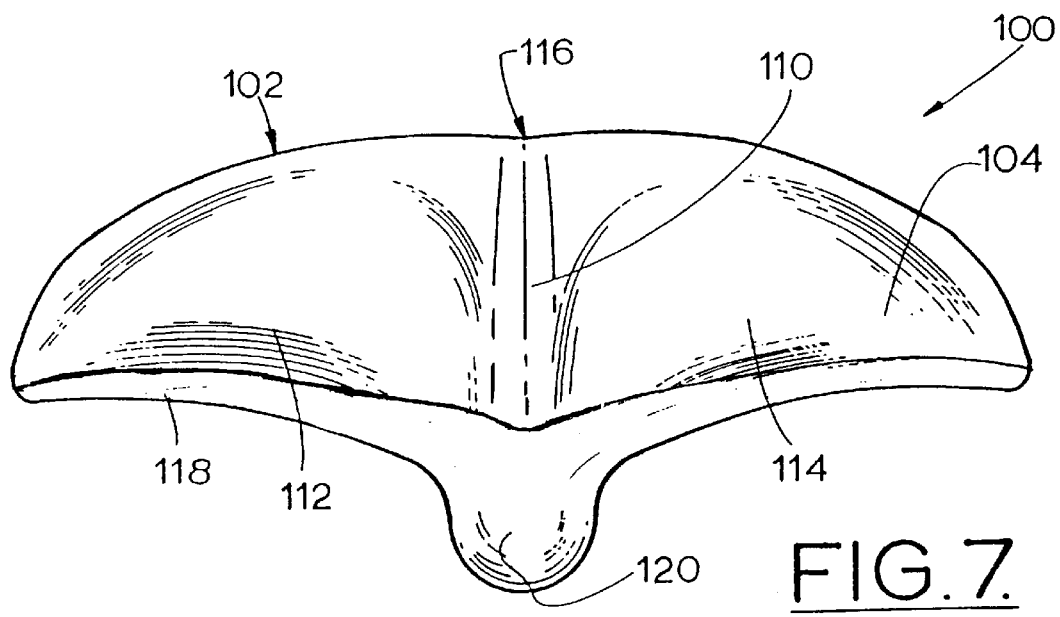
FIG. 7 is a top plan view of the cycle seat of FIG. 5.
Figure 8:
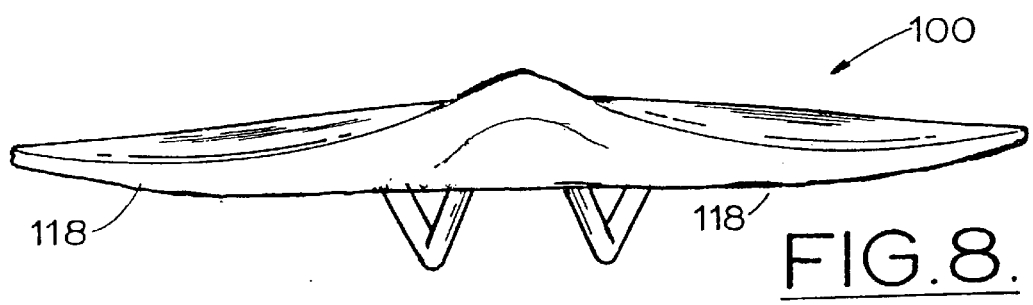
FIG. 8 is a front view of the cycle seat of FIG. 5.
Figure 9:
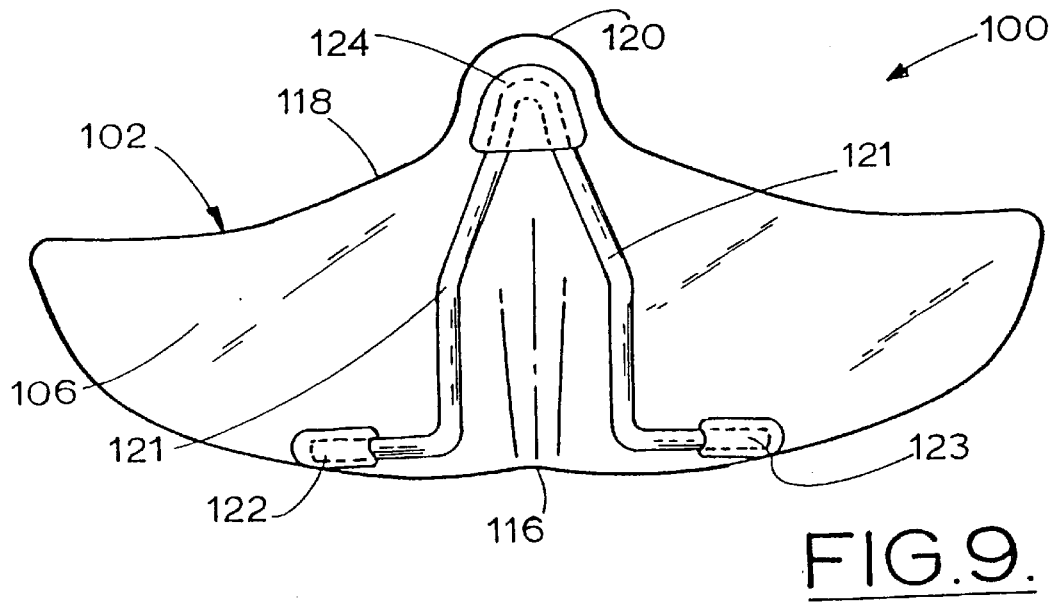
FIG. 9 is a bottom plan view of the cycle seat of FIG. 5.

The seat mounting surface 106 of the member 102 is shown in FIG. 6. It includes cycle mounting means in the form of a bracket 121 for mounting the seat 100 to the frame of a cycle (not shown). In the illustrated embodiment the bracket 121 has broadly an "N" shape with lateral arms at the end of the "N" although obviously the precise shape is not essential. The bracket 121 is mounted to the member 102 by means of mounting elements 122, 123 and 124.

In use, a rider's posterior is mounted on the seat 100 with the ridge formation 110 extending up into their posterior crease. The ischial tuberosities bear down on the formations 112 and 114. This bunches the riders glutial posterior tissue between their ischial tuberosities and the ridge formation 110 and effectively holds the posterior in position on the seat 100. As a result the rider is not susceptible of their pelvis moving from left to right during pedalling of the cycle. The position of the leading edge of the member 102 relative to the formations 112 and 114 and the posterior of rider enables the riders legs to pedal freely without interference from the cycle seat.

An advantage of the seat described above with reference to the drawings is that it resists lateral movement of a rider's pelvis during pedalling. A further advantage is that it permits the rider the freedom to pedal vigorously while seated on the cycle seat in either an upright or a bent over pedalling position. A yet further advantage of the cycle seat described above is that it is reasonably comfortable and does not interfere with the genitals of a rider.

It will of course be realised that the above has been given only by way of illustrative example of the invention and that all such modifications and variations thereto as would be apparent to persons skilled in the art are deemed to fall within the broad scope and ambit of the invention as defined in the appended claims.

I claim:

1. A seat for use with a cycle, the seat including:
   a member having a rider support surface with a leading edge and a rear edge, and an opposed seat mounting surface for mounting to the cycle, the rider support surface being substantially horizontally extending and having a pronounced centrally positioned longitudinally extending ridge formation, and support formations disposed on either side of the ridge formation, the support formations being arranged below the ridge formation and providing support for the ischial tuberosities and surrounding soft tissue of a rider, wherein the ridge formation extends substantially the full length of the rider support surface between said leading edge and said rear edge, but adapted to terminate short of the perineal region of the rider so as not to interfere while riding, and the rider support surface curves upwardly from the support formations to join the ridge formation, said ridge formation having an apex extending therealong and being configured to extend into a region between the rider's buttocks for resisting lateral movement of the rider's pelvis during riding.

2. A seat according to claim 1, wherein the leading edge spaced a short distance forwardly of the support formations supporting the ischial tuberosities so as not to interfere unduly with the movement of thighs of the rider during pedalling.

3. A seat according to claim 2, wherein the apex of the ridge formation is rounded and the leading edge of the member tapers downwardly and forwardly from the rider support surface.

4. A seat according to claim 1, wherein the member further includes a truncated pommel portion projecting forwardly and outwardly from the leading edge of the member in axial alignment with the ridge formation.

5. A seat according to 4, wherein the pommel portion slopes downwardly towards its leading edge.

6. A seat according to claim 1, wherein the support formations on either side of the ridge edge formation slope generally downwardly from the rear edge of the member towards the leading edge of the member.

7. A seat according to claim 6, wherein the support formations slope downwardly at an angle of 10 degrees to 20 degrees.

8. A seat according to claim 1, wherein the rear edge of the member is closely spaced from a rear of the support formations for supporting the ischial tuberosities of the rider.

9. A seat according to claim 1, wherein the rider support surface has a lateral extent extending laterally outwardly beyond the support formations for supporting the ischial tuberosities of the rider.

10. A seat according to claim 9, wherein a lateral extent of the member is substantially greater than an axial or longitudinal extent of the member.

11. A seat according to claim 10, wherein the lateral extent of the member is more than one and a half times as great as the axial or longitudinal extent of the member from a rear of the member to a front of a truncated pommel portion projecting forwardly and outwardly from the leading edge of the member in axial alignment with the ridge formation.

12. A seat according to claim 1, wherein said member is formed from a substantially rigid material which is covered by a layer of resilient material.

* * * * *